Nov. 1, 1960 D. W. HAGELBARGER 2,958,568
PERMANENT MAGNET CODE RECORDING SYSTEM
Filed Jan. 27, 1956 5 Sheets-Sheet 1

INVENTOR
D. W. HAGELBARGER
BY Alan C. Rose
ATTORNEY

Nov. 1, 1960 D. W. HAGELBARGER 2,958,568
PERMANENT MAGNET CODE RECORDING SYSTEM
Filed Jan. 27, 1956 5 Sheets-Sheet 2
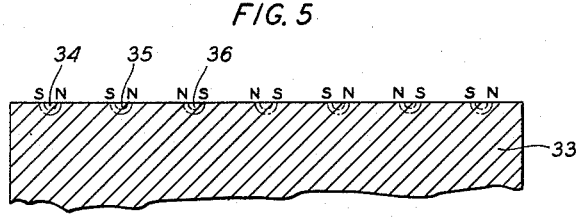
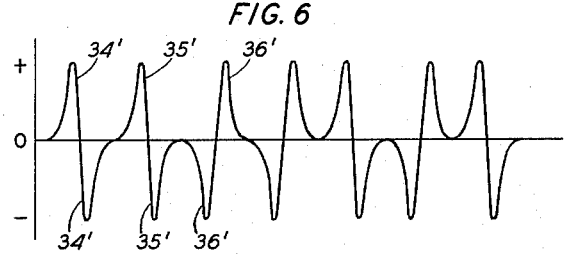
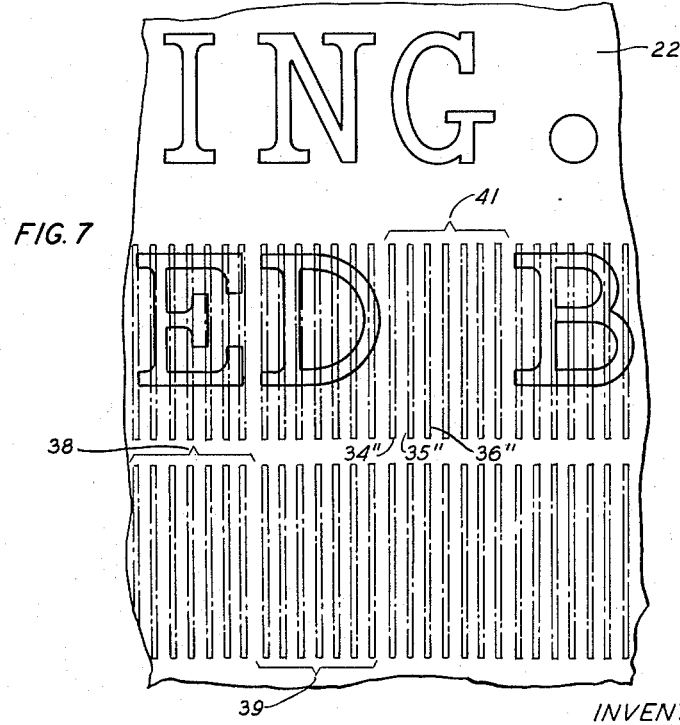
INVENTOR
D. W. HAGELBARGER
BY Alan C. Rose
ATTORNEY Nov. 1, 1960      D. W. HAGELBARGER      2,958,568
PERMANENT MAGNET CODE RECORDING SYSTEM Filed Jan. 27, 1956      5 Sheets-Sheet 3

INVENTOR
D. W. HAGELBARGER
BY Alan C. Rose
ATTORNEY

Nov. 1, 1960      D. W. HAGELBARGER      2,958,568
PERMANENT MAGNET CODE RECORDING SYSTEM
Filed Jan. 27, 1956      5 Sheets-Sheet 4

INVENTOR
D. W. HAGELBARGER
BY Alan C. Rose
ATTORNEY

Nov. 1, 1960 D. W. HAGELBARGER 2,958,568
PERMANENT MAGNET CODE RECORDING SYSTEM
Filed Jan. 27, 1956 5 Sheets-Sheet 5

INVENTOR
D. W. HAGELBARGER
BY Alan C. Rose
ATTORNEY

United States Patent Office 2,958,568
Patented Nov. 1, 1960

2,958,568

PERMANENT MAGNET CODE RECORDING SYSTEM

David W. Hagelbarger, Morristown, N.J., assignor to Bell Telephone Laboratories, Incorporated, New York, N.Y., a corporation of New York Filed Jan. 27, 1956, Ser. No. 561,888

3 Claims. (Cl. 346—74)

This invention relates to magnetic recording apparatus, and more particularly to recording apparatus which simultaneously produces a printed and magnetic code record.

In the processing of information in the form of numbers or messages, economic factors have greatly increased the cost of operations in which information is retranscribed or encoded by human operators. Therefore, at the time the original record is made, it is desirable that the information also be encoded in a form suitable for subsequent automatic processing. Unfortunately, however, the simplest, reliable, data originating apparatus which is commercially available at the present time is a typewriter with an associated electrically actuated tape perforator, which is relatively expensive.

Accordingly, a principal object of the present invention is to provide inexpensive printing and encoding equipment for data processing and information transmission systems.

In addition to the high initial cost, another deterrent to the introduction of new business machines of the type noted above is the necessity for changing existing facilities and office procedures. Thus, for example, when tape perforators are employed, new filing cabinets must be provided for the rolls of tape. In addition, when it is desired to make use of a specific tape, it must be identified by reference to a separate written record, and then the tape must be physically located. The foregoing illustrative changes associated with the introduction of a perforator are typical of the changes in routines and associated equipment which may be expected when new data origination apparatus is added to existing facilities.

Another object of the present invention is, therefore, to minimize the required changes in equipment and routine attendant upon the introduction of information encoding apparatus.

In accordance with the present invention, a typewiter, accounting machine or the like produces a simultaneous printed and magnetically coded record by the use of permanently magnetized code elements associated with each printing character. For specific example, the coded magnets may be secured to the type bars of a typewriter. Flexible ferromagnetic record sheets are also provided to carry both the magnetic record and the typewritten message. The permanently magnetized code elements are impressed on the sheet simultaneously with the type, and a magnetic record is induced in the sheet adjacent the corresponding typewritten character.

The compatibility of the proposed system with existing files for typewritten papers is an important advantage of the present system. For example, the sheet of ferromagnetic material may also serve as the copy for file. When it is desired to utilize the coded information for the purpose of data processing or information transmission, the copy is procured from file in accordance with the legible written material appearing on it. The magnetically coded information on the copy is then scanned by a reading head to obtain the coded information for processing or transmission.

A feature of the invention is the use of small permanently magnetized code elements associated with each printing character of a business machine. For example, a permanently magnetized code element of barium ferrite (sold under the trade name "Ferroxdure") need be no wider than the face of a type bar of an ordinary typewriter. A typewriter could thus be converted into a magnetic data origination machine merely by the insertion of a new set of type bars equipped with the permanently magnetized code elements.

The ease of correcting errors is another advantage of the present invention. When the ferromagnetic record sheet is subjected to the influence of two successive code elements, the inductive force of the second permanently magnetized element wipes out the code pattern of the first element and reorients the magnetic domains in the sheet in accordance with the new code pattern. In correcting a mistake in the typewritten copy, after erasing the incorrect letter, a new letter is typed into the proper space. At this time, the new code element is also applied to the ferromagnetic sheet and accordingly corrects the erroneous code pattern.

Other objects, features, and advantages of the invention will become apparent from the following detailed description taken in conjunction with the associated drawings, and from the appended claims.

In the drawings:

Fig. 5 is a partial cross-sectional view of the code element of Fig. 4 showing the magnetized zones in detail;

Fig. 6 represents the electrical pulse pattern resulting from the rapid passage of a magnetic pick-up head over a surface magnetized by the code element shown in Fig. 5;

Fig. 7 is a diagram showing the relative position of magnetic code groups and the corresponding printed letters on a ferromagnetic record sheet;

Figure 1:
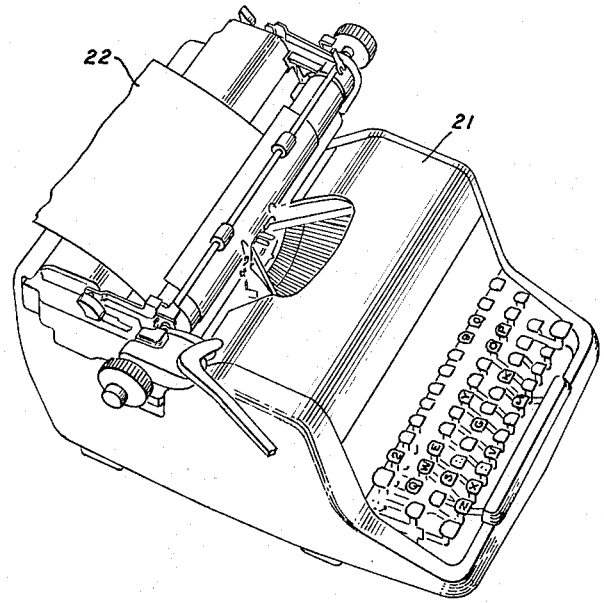
Fig. 1 shows a combined typewriting and magnetic recording apparatus in accordance with the invention.

Referring more particularly to the drawings, Fig. 1 shows a combined typewriting and magnetic recording apparatus 21. The flexible sheet 22 inserted in the apparatus 21 is of a light colored ferromagnetic material. The sheet 22 can therefore receive both typewritten material and coded magnetic indications.

Figure 2:
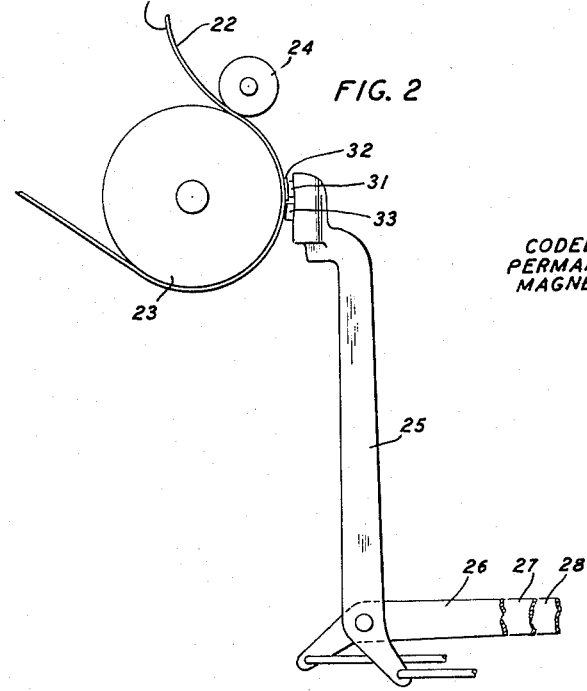
Fig. 2 is a side view of a portion of the apparatus of Fig. 1 showing the typing and magnetic recording of one letter on a flexible sheet of ferromagnetic material.

Fig. 2 shows the critical operative elements of the apparatus of Fig. 1 in somewhat greater detail. More specifically, the flexible sheet 22 is held between the platen 23 and the retaining roller 24. One type bar 25 is shown in the operative position, while the remaining type bars 26, 27 ... 28 are in the inactive position. As shown in Fig. 2, when the type bar 25 is actuated, the type element 31 strikes the typewriter ribbon 32 and prints a character on the sheet 22. In addition, the permanently magnetized code element 33 strikes the sheet 22 immediately below the type element 31, and induces a distinctive magnetic code in the ferromagnetic sheet.

Figure 3:
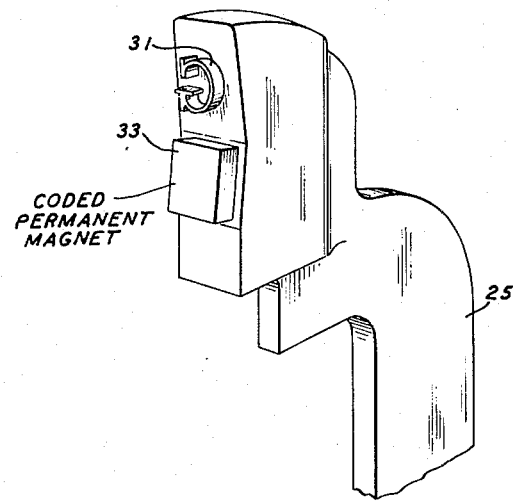
Fig. 3 represents the upper end of a type bar, and shows one letter of type and the corresponding magnetized code element on the face of the type bar.

Fig. 3 is an enlarged view of the upper end of the type bar 25 shown in the apparatus of Fig. 2. In Fig. 3, the type element 31 is clearly seen to be the letter "G." The permanently magnetized code element 33 is located below the type element 31 and at a slight angle, so that both elements strike the record sheet 22 firmly.

For simplicity, the typewriting and recording apparatus shown in Figs. 1 through 3 is limited to capital letters. It is to be understood, however, that lower case letters, together with the required additional magnetized code elements, may also be employed.

Figure 4:
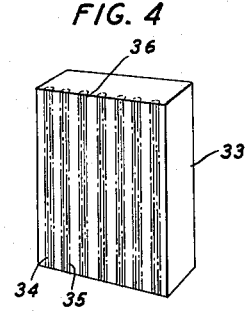
Fig. 4 is a detailed view of a permanently magnetized code element.

The code element 33 of Fig. 3 is shown in greater detail in Figs. 4 and 5. In Fig. 4, the longitudinal zones of magnetization of the code element 33 are shown in dash-dot lines at 34 and 35, for example. Fig. 5 is a cross-sectional view of a portion of the code element of Fig. 4. As seen in Fig. 5, the longitudinal magnetization zones are narrow south-to-north pole magnetized regions. In order to permit magnetization of the type shown in Figs. 4 and 5, it is desirable that the code element be made of a permanently magnetizable material. Specifically, barium ferrite having a chemical composition of $BaFe_{12}O_{19}$ and known commercially as Ferroxdure is preferred for these elements.

Each of the elongated magnetized zones of the code element 33 of Fig. 5 represents one binary digit, or "bit," of information. For example, a south-north magnetized zone could represent the binary symbol "1," while the reverse, or north-south magnetization of a particular area could represent the binary symbol "0." With seven binary digits of information, it is possible to obtain $2^7$, or 128 different code patterns. This is sufficient to transmit all of the information on a typewriter keyboard, for example.

When a magnetic reading head is passed rapidly over a surface magnetized by a code element such as that shown in Fig. 5, the electrical pulses in the output circuit of the reading head take the form shown in Fig. 6. Thus, for example, the south-north magnetized zones 34 and 35 produce a characteristic pulse pattern in which a positive pulse is closely followed by a negative pulse, as indicated at 34', 35' in Fig. 6. The north-south magnetized zone 36, however, produces a pulse pattern indicated at 36' in Fig. 6 which is the inverse of that produced by south-north magnetized zones. Circuits are provided at a decoding point which recognize the difference between the two types of digital pulse forms. Circuits of this type are well known in the art, and may, for example, be realized by an integration circuit followed by a rectifier. When such a circuit is employed, the pulse pattern indicated in Fig. 6 may readily be decoded as representing a specific character.

Fig. 7 shows a small portion of the ferromagnetic sheet 22. This sheet may, for example, be a sheet of paper which is coated with particles of ferromagnetic material. This type of coated sheet is well known in the magnetic recording art, and is used in strip form for tape recording. Fig. 7 shows several typed characters and their associated code patterns, which are impressed on the magnetic record sheet 22 immediately below the type character. The magnetized code patterns are not visible to the eye, but are shown in dash-dot lines in Fig. 7 for explanatory purposes. Thus, for example, the code pattern 38 is associated with the letter "E." Similarly, the code pattern designated 39 is associated with the letter "D," and the code pattern 41 is associated with the letter "G." It may also be noted that the first three zones 34'', 35'', and 36'' of the code pattern 41 correspond to the magnetized zones 34, 35, and 36 of Fig. 5, and were formed by the impressing of code element 33 on sheet 22 as the letter "G" was printed.

The seven longitudinal magnetized areas in the code pattern 41 must be positioned less than .025 inches apart to fit in the space allotted to a character in most business machines. Specifically, they must be spaced apart by less than .014 inch to fit in the one-tenth of an inch in one typewriting space. Tests indicate that magnetic code patterns having considerably less space between magnetization zones than .014 inch may still be readily decoded. However, it is desirable to utilize as much space as is available to obtain error free operation.

In Fig. 7, the magnetization patterns are positioned so that they extend slightly above and below the next successive typewritten line. This position is not critical, however, and in some cases it is desirable to position the magnetization patterns between lines of typing. This facilitates reading the magnetic record, even though the record sheet is embossed by the typing operation.

Figure 8:
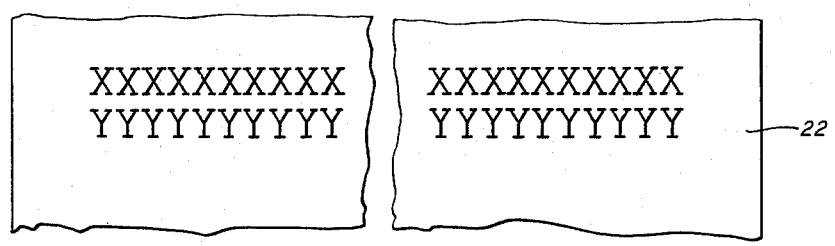
Fig. 8 is a diagram showing two lines of printing on a ferromagnetic sheet.
Figure 9:
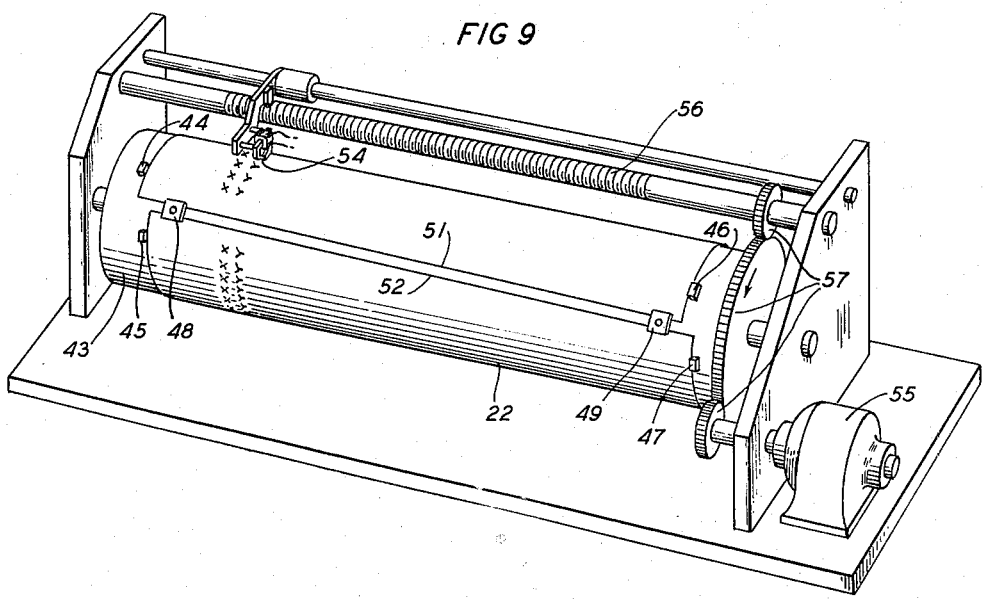
Fig. 9 is a transmitting apparatus including a magnetic pick-up head for reading the coded information from the sheet shown in Fig. 8.

Figs. 8 and 9 illustrate diagrammatically the process of reading out information which is stored on a magnetic record sheet such as sheet 22. To give a convenient frame of reference, first and second rows of "X" characters and "Y" characters, respectively, are shown on the magnetic record sheet 22 in Fig. 8. The two rows of characters are also visible in Fig. 9. In Fig. 9, however, the sheet 22 is shown mounted on a roller 43 in a slightly skewed position. It is held in the desired skewed position by the positioning stops 44, 45, 46, and 47, and by the retaining clips 48 and 49. The amount of offset at the edges 51, 52 of the sheet 22 is exactly equal to the space between successive lines of type. The motor 55 drives the roller 43 and the lead screw 56 by the gearing 57. The pitch of the lead screw 56 and the nature of the gearing 57 is chosen so that the reading head 54 moves laterally a distance equal to the space between successive lines of type each time the roller 43 makes one revolution. The magnetic reading head 54 therefore passes directly from the end of line X to the beginning of the next lower line Y. Accordingly, as the reading head 54 passes over successive pulse patterns on the sheet 22, coded output pulses, such as those shown in Fig. 6, are transmitted to suitable data processing apparatus attached to its output leads.

Figure 10:
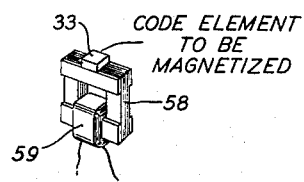
Fig. 10 shows an electromagnetic unit for magnetizing the code elements shown in Figs. 2 through 5.
Figure 11:
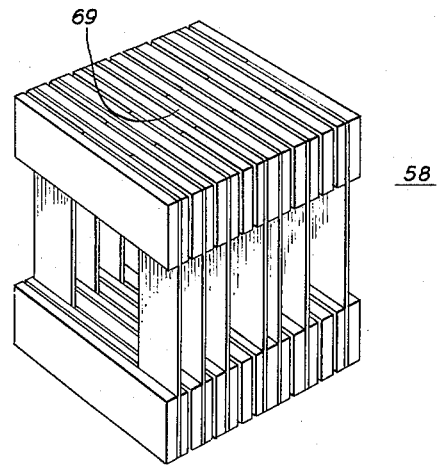
Fig. 11 is a detailed view of the core structure of the magnetizing unit of Fig. 10.
Figure 12:
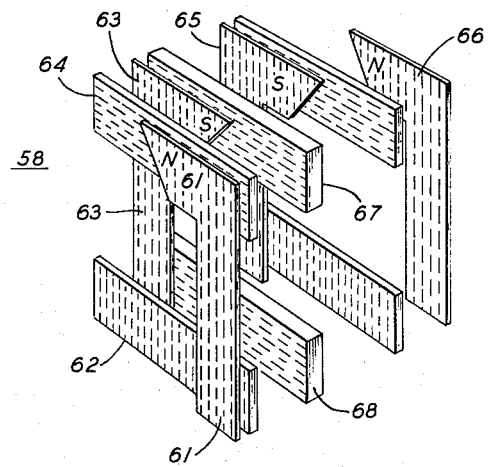
Fig. 12 is an exploded view of a part of the core structure of Fig. 11.

Figs. 10, 11, and 12 show an apparatus which may be employed to produce appropriate pulse patterns in the Ferroxdure code elements 33. In Fig. 10, a magnetic core structure 58 is energized by a coil 59. The energization of the coil 59 magnetizes the core 58 to produce the desired code pattern in the Ferroxdure element 33. The core 58 of Fig. 10 is shown in greater detail in Fig. 11. In addition, Fig. 12 shows a partial exploded view of the core structure of Fig. 11. For convenience, reference will first be made to the exploded view of Fig. 12.

The core structure 58 of Fig. 12 is made up of "soft" magnetic elements (made of material having a high magnetic saturation) which bear vertical dash-dot lines, and nonmagnetic elements bearing horizontal dash-dot lines. Thus, for example, the three elements 61, 62, and 63 are made of magnetic material, whereas the element 64, which is located between the upper ends of the elements 61 and 63, is of nonmagnetic material. For convenience, the upper ends of the flat magnetic elements 61 and 63 are designated by the letters "N" and "S" to indicate that they form north and south magnetic poles. In the assembled core structure 58, the lower ends of the magnetic elements 61 and 63 are in engagement with the magnetic element 62. The upper ends, however, are separated by the nonmagnetic strip 64. Accordingly, a strong magnetic field region is developed between the overlapping pole pieces of elements 61 and 63, which are labeled "N" and "S" in Fig. 12. Similarly, a strong magnetic field is developed across the overlapping pole pieces of the magnetic elements 65 and 66. To avoid interaction between the magnetic circuit including elements 61, 62 and that including elements 65 and 66, the relatively thick nonmagnetic spacers 67 and 68 are provided.

The magnetic core of Fig. 11 includes seven pairs of magnetic plates of the type indicated at 61, 63 and at 65, 66 in Fig. 12. The core structure also includes thin nonmagnetic strips between the overlapping pole pieces of each pair of magnetic plates to provide a series of regions of strong magnetic field intensity, and the core includes thick nonmagnetic spacers between the pairs of pole pieces to isolate the regions of high magnetic field strength. Depending on the order of insertion of the magnetic elements having overlapping pole pieces in the completed magnetic core, the magnetic field across each of the seven pairs of plates will be from north to south, or from south to north magnetic polarity. The regions of high magnetic field intensity are shown at 69 on the central portion of the upper surface of the magnetic core structure. In preparing core samples, a small block of Ferroxdure may be placed on this central area 69, and a surge of magnetic flux may be introduced into the core 58 by strong energization of the coil 59. The core 58 is merely representative of one core structure of many which are required to magnetize a complete set of code elements. A separate core structure is, of course, required for each different code pattern.

In order to show the relative thickness of the plates in the core structure 58, all of the plates have been shown thicker than their proper relative thicknesses in Figs. 11 and 12. This has the effect of increasing the width of the core structure 58 in Fig. 12, as contrasted with its proper shape, as shown in Fig. 10. To indicate the order of the thicknesses involved, the distance between plates 61 and 65 of Fig. 12 after assembly is approximately fourteen thousandths of an inch, and the width of the entire core structure is about one tenth of an inch.

Core structures similar to that shown in Figs. 10, 11, and 12 may also be employed in place of code elements such as 33 in Fig. 3, for example. One required change is the substitution of a permanent magnet for the portion of the core 58 enclosed by the winding 59. The core is then mounted on the type bar so the area 69 makes contact with the ferromagnetic record member.

An alternative method which may be employed for producing magnetic zones is the use of fine wires of small diameter placed over the surface of the magnetizable material. When the wires are appropriately energized with high intensity currents, permanent magnetic field patterns such as those shown in Figs. 4 and 5 are produced in the magnetic material.

Figure 13:
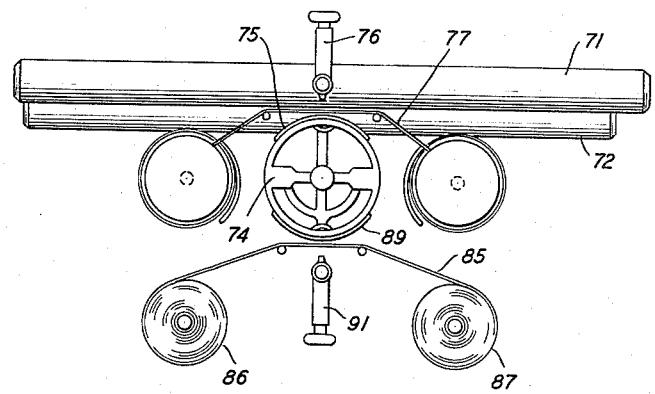
Fig. 13 illustrates the application of the principles of the invention to another form of typewriting apparatus.
Figure 14:
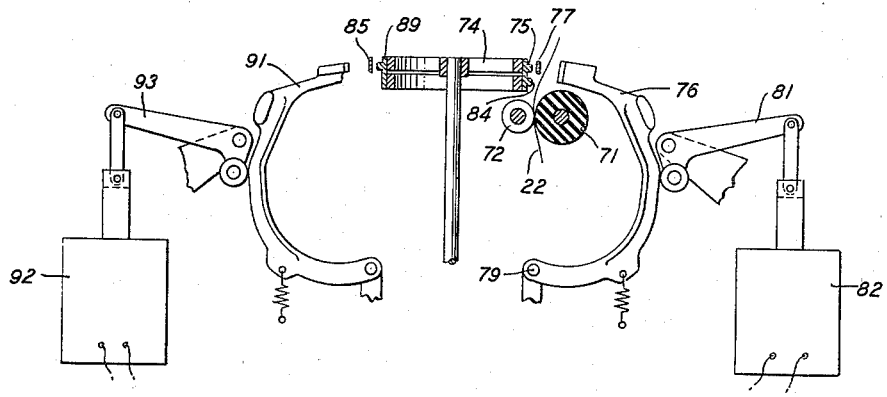
Fig. 14 is a side view of the apparatus of Fig. 13.

Figs. 13 and 14 illustrate the application of the principles of the invention to typewriting structures which are sold under the trade name "Vari-typers." Apparatus of this type is described in United States Patents 2,465,657 granted March 29, 1949 to C. W. Norton, and 2,664,184 granted December 29, 1953 to H. Johnson.

In the arrangement shown in Fig. 13, the record sheet is held between the platen 71 and the retaining roller 72. As described in the above-identified patents, the rotatable anvil wheel 74 carries a removable type shuttle 75. When a typewriting key is depressed, the anvil wheel 74 is rotated to the selected position. The hammer 76 is then moved forward to press the record sheet 22 firmly against the inked ribbon 77 and the selected character in the type shuttle 75. The hammer 76 is pivoted at 79 and is actuated by the mechanical linkage 81 associated with the solenoid 82.

As clearly shown in Fig. 14, the anvil wheel 74 carries a permanently magnetized shuttle 84 in addition to the type shuttle 75. The permanently magnetized shuttle 84 may be made of the same ferrite material as the code element 33 shown in Figs. 3 through 5. The coded magnetization pattern on the shuttle 84 is also similar to that on block 33, as shown in Figs. 4 and 5. However, instead of being formed of a series of separate blocks of Ferroxdure material, each bearing a single code pattern, the shuttle 84 is a single elongated curved ferrite element having a series of magnetic code patterns across its face. Each of the code patterns corresponds to the character appearing on the type shuttle 75 immediately above the code pattern in question. When the hammer 76 is actuated, the record sheet 22 is pressed against the magnetized shuttle 84, as well as against the ribbon and the type shuttle. This produces a magnetic coded record of the character printed on the record sheet 22 immediately below the printed indication. Thus, the sheet 22 in Fig. 14 is magnetized in exactly the same manner as described above in connection with Fig. 7.

If desired, an additional record on a magnetic tape may be formed concurrently with the encoding of the sheet 22. In Fig. 13, the magnetic tape 85 is wound on the reels 86 and 87. An additional permanently magnetized shuttle 89 is mounted on the side of the anvil wheel 74 which faces the magnetic tape 85. The magnetized shuttle 89 bears the same magnetic pattern which appears on the shuttle 84. Accordingly, the simultaneous energization of hammer 76 and hammer 91 produces identical magnetic code patterns on the tape 85 and the record member 22. A suitable indexing mechanism is provided to move the magnetic tape 85 forward by a distance corresponding to one magnetic code pattern each time a typewriter key is struck. The electrical connections to solenoids 82 and 92 may be connected in parallel, so that the mechanical linkages 81 and 93 are actuated in unison and the hammers 76 and 91 strike at the same time.

In conclusion, the simplicity and resulting low cost of the present data origination apparatus is again stressed. A significant factor in attaining this simplicity is the physical association of the printing and associated magnetic coding elements. By this technique, the use of additional electrical or mechanical selection apparatus for the encoding process is avoided.

It is to be understood that the above-described arrangements are illustrative of the application of the principles of the invention. Numerous other arrangements may be devised by those skilled in the art without departing from the spirit and scope of the invention.

What is claimed is:

1. Apparatus for magnetically recording and visually printing information along a preassigned direction on a magnetizable recording medium by simultaneously impressing a selected one of a plurality of printing elements and a corresponding one of a plurality of distinctive permanently magnetized code elements on the recording medium characterized in that each of said code elements is a single body of magnetizable material having a uniform surface for engagement with the recording medium, that said surface of each of said elements has a like plurality of elongated parallel localized zones permanently magnetized in a distinctive space pattern and that said space pattern for each of said code elements is a distinctive arrangement of narrow north-south and south-north permanent magnetizations in the zones thereof.

2. Apparatus according to claim 1 characterized in that each of said code elements is a single body of barium ferrite.

3. Apparatus according to claim 1 characterized in that said elongated parallel localized zones are oriented perpendicular to the preassigned direction of recording.

References Cited in the file of this patent

UNITED STATES PATENTS

| | | |
|---|---|---|
| 2,114,294 | Green | Apr. 19, 1938 |
| 2,350,893 | Hofgaard | June 6, 1944 |
| 2,540,287 | Potts | Feb. 6, 1951 |

(Other references on following page)